(No Model.)

J. P. OSTERMAN.
BARBED WIRE FOR FENCES.

No. 268,721. Patented Dec. 5, 1882.

Witnesses.
Thos. H. Hutchins.
Wm. J. Hutchins.

Inventor.
John P. Osterman.

UNITED STATES PATENT OFFICE.

JOHN P. OSTERMAN, OF JOLIET, ILLINOIS, ASSIGNOR OF ONE-HALF TO PETER ADELMAN, OF SAME PLACE.

BARBED WIRE FOR FENCES.

SPECIFICATION forming part of Letters Patent No. 268,721, dated December 5, 1882.

Application filed September 2?, 1882. (No model.)

*To all whom it may concern:*

Be it known that I, JOHN P. OSTERMAN, of the city of Joliet, in Will county, and State of Illinois, have invented certain new and useful Improvements in Barbed Wire for Fences, the construction and operation of which I will proceed to explain, reference being had to the annexed drawings and the letters and figures thereon, making a part of this specification, in which—

Figure 1:
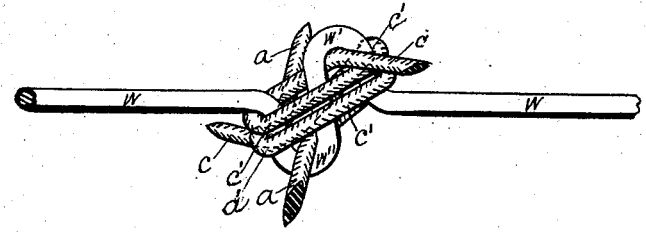
Figure 2:
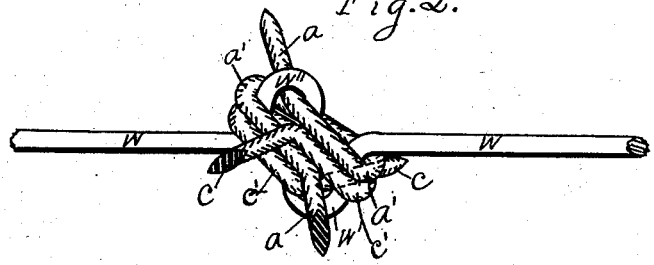

Figures 1 and 2 are perspective views. Figs. 3, 4, 6, and 7 are views of the barbs detached from the strand-wire; and Fig. 5, a view of the strand-wire, showing the S-shaped bend in it, on which the barbs are supported.

The object of this invention is to provide the strand wire or wires of a wire fence with barbs or prods for fence purposes; and the invention herein consists in the novel way in which the barbs are placed upon the strand-wire.

Figure 4:
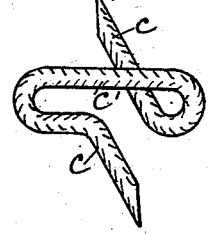
Figure 5:

Referring to the drawings, $w$ represents the strand-wire of the fence, provided at intervals along its length with the S-shaped bends shown in Figs. 1, 2, and 5. For convenience, the S-shaped bend has its two bends lettered $w'$ and $w''$, respectively. The S-shaped bend in the strand-wire $w$ is so placed that the line of the strand-wire would pass through its center. The barbs are made of wire, and their peculiar form is shown in Figs. 3, 4, 6, and 7, and are denominated "right" and "left" barbs, as shown in the said figures. The said barbs, in order to be placed on the strand-wire $w$, are bent around and inclose the S-shaped bend in the strand-wire, as shown in Figs. 1 and 2, the said figures being reversed, so it will be more easy to trace the course of each barb. The barbs are placed on said bend in pairs—right and left. By reference to Fig. 2 it will be observed that barb $a'$ is bent around to inclose the S-shaped bend of the strand above barb $c'$, and has one of its prods $a$ pass through the loop $w''$ of said bend, to prevent the S-shaped bend in the strand from being pulled out straight by tension on the strand and to assist in holding the barb on. Barb $c'$ is bent around the said S-shaped bend in a similar manner below barb $a'$, and its prod $c$ passes through the opposite loop, $w'$, of the said S-shaped bend. The opposite prods of either of the said barbs are bent outward from the strand at right angles, or nearly so, with the strand $w$, as shown.

Figure 3:
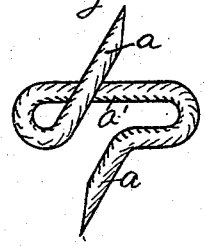
Figure 6:
Figure 7:
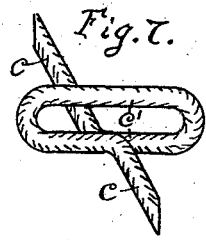

The form of the barbs shown in Figs. 6 and 7 shows their bends a little longer than those in Figs. 3 and 4, so they may inclose more of the S-shaped bend in the strand-wire, if desired. The forms shown in said Figs. 6 and 7 are the forms that are probably the most practicable to use. By this construction four barbs or prods are provided at a place, forming a very strong, cheap, and effective barbed wire.

Having thus described my invention, what I claim as new, and desire to secure by Letters Patent, is as follows, to wit:

In a barbed wire for fences, the wire strand $w$, having the S-shaped bend described, on which the twin barbs $a'$ and $c'$ are placed, so as to lie on a parallel line with each other and on a diagonal line with the wire strand $w$, and having the prods $a$ and $c$ passed under the bends $w'$ and $w''$, to prevent the S-shaped bend from straightening and to assist in holding on the barbs $c'$ and $a'$, in the manner set forth.

JOHN P. OSTERMAN.

Witnesses:
PETER ADELMANN,
WM. J. HUTCHINS.